United States Patent [19]

Nakano et al.

[11] Patent Number: 4,641,309

[45] Date of Patent: Feb. 3, 1987

[54] METHOD AND APPARATUS FOR SELECTIVELY COMPENSATING BURST ERRORS OF VARIABLE LENGTH IN SUCCESSIVE DIGITAL DATA WORDS

[75] Inventors: Kenji Nakano, Ebina; Hisayoshi Moriwaki, Tokyo, both of Japan

[73] Assignee: Sony Corporation, Tokyo, Japan

[21] Appl. No.: 750,243

[22] Filed: Jul. 1, 1985

Related U.S. Application Data

[63] Continuation of Ser. No. 447,119, Dec. 6, 1982, abandoned.

[30] Foreign Application Priority Data

Dec. 8, 1981 [JP] Japan ................................ 56-197437

[51] Int. Cl.⁴ .............................................. G06F 11/10
[52] U.S. Cl. ......................................... 371/31; 371/40
[58] Field of Search ............................ 371/31, 39, 40; 360/38.1, 53; 358/314

[56] References Cited

U.S. PATENT DOCUMENTS

| | | | |
|---|---|---|---|
| 3,648,238 | 3/1972 | Yarrington | 371/40 |
| 4,146,099 | 3/1979 | Matsushima | 371/31 X |
| 4,202,018 | 5/1980 | Stockham, Jr. | 371/31 X |
| 4,315,331 | 2/1982 | Lemoine et al. | 371/31 |
| 4,356,564 | 10/1982 | Doi et al. | 371/40 |
| 4,430,736 | 2/1984 | Scholz | 371/31 |
| 4,433,415 | 2/1984 | Kojima | 371/40 X |
| 4,441,184 | 4/1984 | Sonoda et al. | 371/40 |
| 4,451,921 | 5/1984 | Odaka | 371/31 X |
| 4,497,055 | 1/1985 | Hoshino et al. | 371/31 |
| 4,519,001 | 5/1985 | Morrison | 371/31 X |

*Primary Examiner*—Charles E. Atkinson
*Attorney, Agent, or Firm*—Lewis H. Eslinger; Alvin Sinderbrand

[57] ABSTRACT

A method and apparatus for selectively compensating burst errors of variable length in successive data words. Correct and erroneous data words are identified, and the presence of one of the following error conditions is sensed: (a) an erroneous data word preceded and followed, respectively, by correct data words; (b) plural successive erroneous data words preceded and followed, respectively, by correct data words; and (c) a predetermined number of successive erroneous data words preceded by a correct data word. These error conditions are compensated respectively as follows: (a) the erroneous data word is replaced with a compensated data word derived from one interpolation of a correct preceding and following data word; (b) the plural erroneous data words are replaced with respective compensated data words derived from plural interpolations of the correct preceding and following data words; and (c) at least the first of the predetermined number of successive erroneous data words is replaced with the preceding correct data word.

40 Claims, 25 Drawing Figures

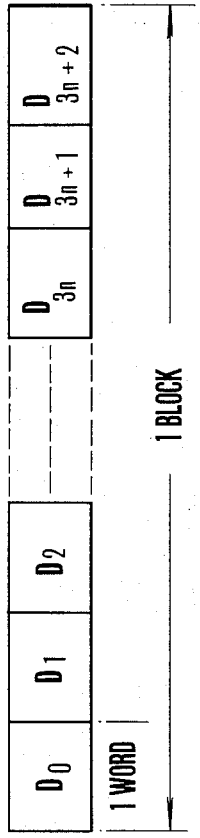
FIG. 1A
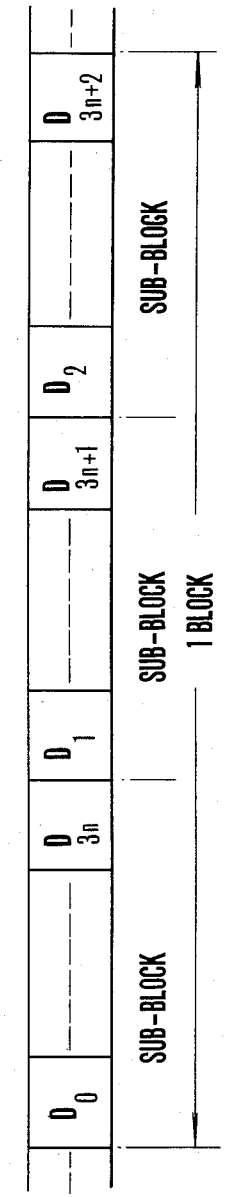
FIG. 1B
FIG. 1C

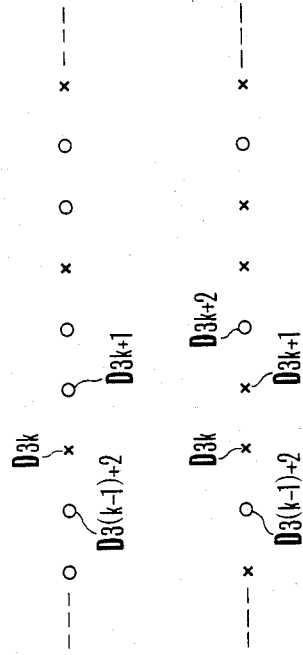
F I G. 2A
F I G. 2B
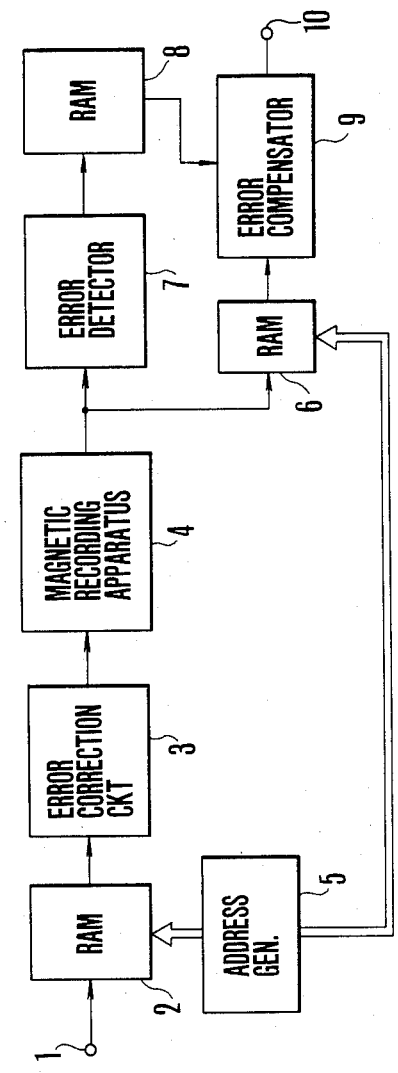
F I G. 3

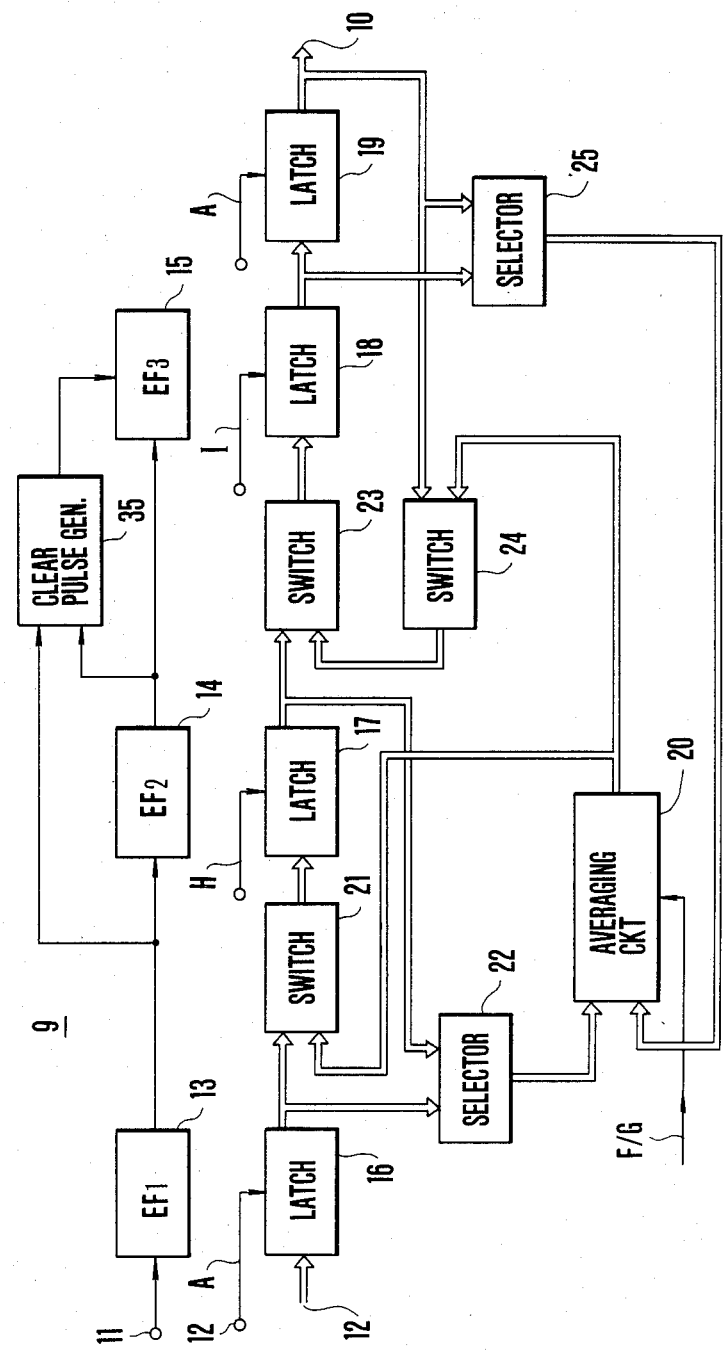

| EF1 | 0 | 1 | 0 | 1 | 0 | 1 |
|---|---|---|---|---|---|---|
| EF2 | 0 | 0 | 1 | 1 | 1 | 1 |
| EF3 | 0 | 0 | 0 | 0 | 1 | 1 |
| | NO COMPENSATION | NO COMPENSATION | ONCE AVERAGING | NO COMPENSATION | THREE AVERAGING | PREVIOUS VALUE HOLD |

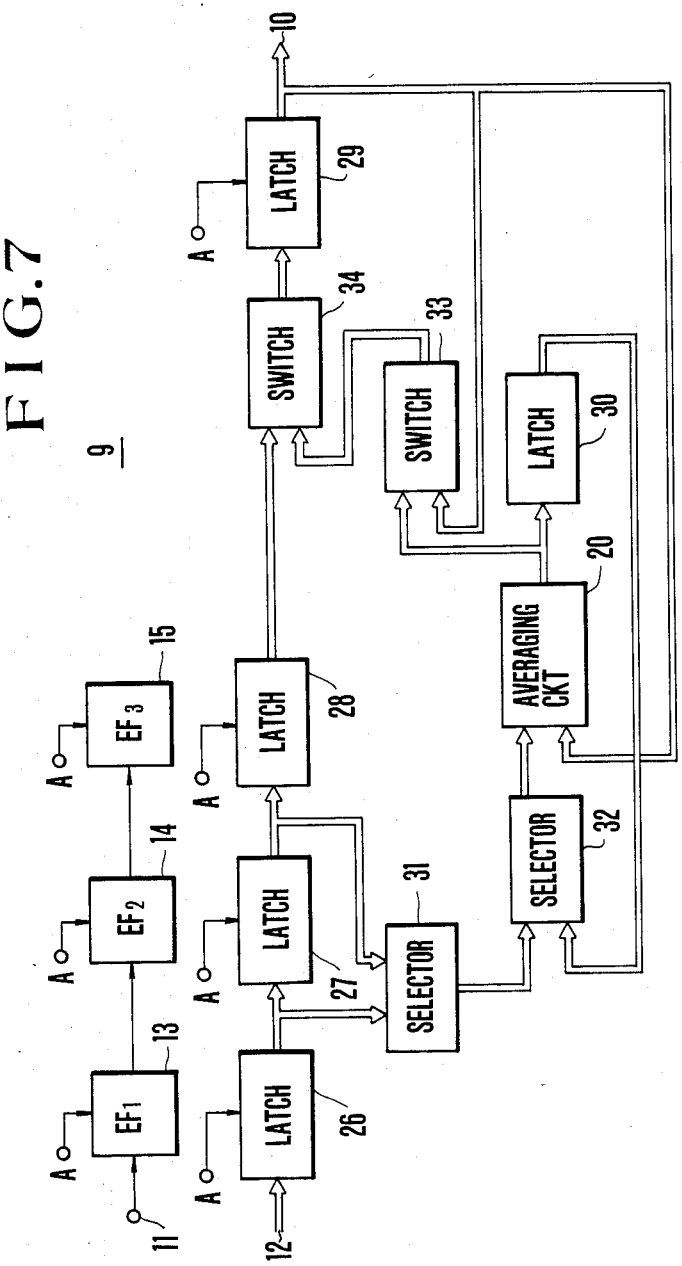
F I G. 7

FIG.8

| EF$_1$ | 0 | 1 | 0 | 1 | 0 | 1 | 0 | 1 |
|---|---|---|---|---|---|---|---|---|
| EF$_2$ | 0 | 0 | 1 | 1 | 0 | 0 | 1 | 1 |
| EF$_3$ | 0 | 0 | 0 | 0 | 1 | 1 | 1 | 1 |
| | NO COMPENSATION | NO COMPENSATION | NO COMPENSATION | NO COMPENSATION | ONCE AVERAGING | ONCE AVERAGING | THREE AVERAGING | PREVIOUS VALUE HOLD |

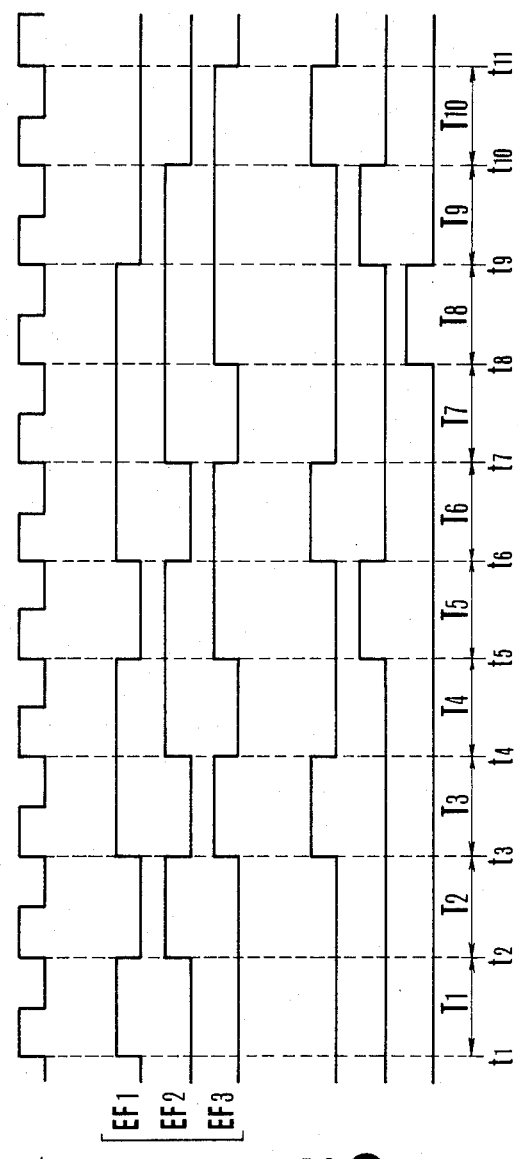

METHOD AND APPARATUS FOR SELECTIVELY COMPENSATING BURST ERRORS OF VARIABLE LENGTH IN SUCCESSIVE DIGITAL DATA WORDS

This is a continuation of application Ser. No. 447,119 filed Dec. 6, 1982, now abandoned.

BACKGROUND OF THE INVENTION

This invention relates to a technique for compensating errors that may be present in successive digital data words and, more particularly, to such a technique wherein burst errors of variable length are compensated selectively and automatically, depending upon the number of successive data words which are sensed as being erroneous.

Digital encoding techniques have been applied to various fields of information transmission and recording. For example, audio and video data originating as analog signals are converted to digital representations which are coded in a manner to minimize errors that would affect the recovery of the original information. One of such encoding techniques is the time-interleaved code, wherein a "block" of successive data words might be interleaved with data words from one or several other blocks, the resultant interleaved data words then being transmitted or recorded. With this code, even if one or more adjacent data words in the interleaved block are distorted during transmission, recording, receiving or playback operations, it is appreciated that, when the data words are de-interleaved to recover the original data blocks, only a few (typically, one) of those data words will be distorted. If such data words are further encoded in a conventional error-correcting code, the distorted data word may be corrected in accordance with the known capabilities of such error correcting codes.

When audio or video information is represented by digital signals, the fact that such information generally is relatively slowly varying means that an erroneous data word can be closely approximated by interpolation. For example, let it be assumed that, of three successive words, the first word is correct, the second is erroneous and the third is correct. In accordance with the aforementioned time-interleaved encoding technique, it is not unusual for burst errors which are present in the time-interleaved data block to result, after de-interleaving, in only one out-of-three de-interleaved data words as being erroneous. Here, the erroneous data word may be approximated by taking the average of the first and third (the preceding and following) data words.

A still closer approximation of the erroneous data word may be made by the so-called cubic interpolating technique. Cubic interpolation is utilized if the erroneous data word is preceded by two successive correct data words and is followed by two successive correct data words. Here too, this pattern of one-out-of-five data words as being erroneous is not unusual when burst errors affect the interleaved data words which constitute a time-interleaved block.

Yet another technique which is utilized to correct an erroneous data word is the so-called previous-value hold technique wherein an erroneous data word is replaced by the immediately preceding, correct data word.

Of the foregoing interpolation techniques, cubic interpolation generally provides the closest approximation of a correct data word, that is, the original data word which has been distorted, and the previous-value hold technique provides the least approximation of these three. But, a substantially greater amount of circuitry and circuit operating capacity are needed in order to improve the degree of approximation for compensating the erroneous data word. Hence, the degree of accuracy with which errors are compensated must be weighed against the complexity and cost of the error correction apparatus.

It is desirable to provide error compensating circuitry which can adapt to the number of errors which are present. For example, with smaller burst errors which may affect only every other data word, compensation based on relatively simple averaging may be satisfactory. For a relatively larger burst error wherein several successive data words are distorted, it may be necessary to replace one or more of such erroneous data words by using the previous-value hold technique. Likewise, if the burst error is of intermediate size, resulting in errors in a relatively small number of successive data words, it is advantageous to provide yet another data compensating, or interpolating, technique to correct those erroneous words. Depending upon the particular error condition which is present, an appropriate one of the aforementioned compensating techniques should be used.

OBJECTS OF THE INVENTION

Therefore, it is an object of the present invention to provide an improved method and apparatus for compensating errors in data words.

Another object of this invention is to provide a method and apparatus for selectively compensating burst errors of variable length in successive data words.

A further object of this invention is to provide an error compensating technique wherein several predetermined error conditions are detected and, depending upon the particular error condition which is present, a corresponding type of error compensation is carried out.

An additional object of this invention is to provide a technique of the aforementioned type wherein different error compensation operations are carried out in order to correct every other data word which may be erroneous, or in order to correct two successive data words which may be erroneous, or in order to compensate for a predetermined number of successive data words which may be erroneous.

A still further object of this invention is to provide a method and apparatus for compensating burst errors of variable length in successive data words and, depending upon the sensed errors, compensating therefor in accordance with a process that provides close approximation of the corrected words.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for selectively compensating burst errors of variable length in successive digital data words. Correct and erroneous data words are identified, and the presence of one of the following error conditions is sensed: (a) an erroneous data word preceded and followed, respectively, by correct data words; (b) plural successive erroneous data words preceded and followed, respectively, by correct data words; and (c) a predetermined number of successive erroneous data words preceded by a correct data word. These error conditions are compensated respectively as follows: for condition (a), the erroneous data word is replaced with a compensated data word derived from one interpolation of a correct preceding and following data word. For condition (b), the plural erroneous data words are replaced with respective compensated data words derived from plural interpolations of the correct preceding and following data words. For condition (c), at least the first of the predetermined number of successive erroneous data words is replaced with the preceding correct data word.

In a preferred embodiment, four successive data words are stored. For condition (a), the erroneous data word is replaced by the average of the preceding and following data words. For condition (b), the first and fourth data words, which are assumed to be correct, are averaged to produce a pseudo interpolated word, and this pseudo interpolated word is averaged with, for example, the fourth data word to produce a corrected word which is substituted for the erroneous, third word. Thereafter, this corrected third word is averaged with the first word to produce another corrected word which, in turn, is substituted for the erroneous second data word.

In one aspect of the invention, these four successive data words are stored in the respective stages of a register whose contents are shifted by one stage at the beginning of a shift clock period. The corrections and replacements mentioned above are carried out prior to the beginning of the next-following shift clock period. In accordance with another aspect of this invention, when an erroneous data word is stored in the third stage of the register, a corrected word derived by the aforementioned techniques is shifted into the fourth stage in place of this erroneous data word at the next shift clock period.

It is a feature of this invention to accompany each data word with an error flag whose state is representative of the correct/erroneous condition of its associated data word. Preferably, the error flags are stored in a flag register and are utilized to determine the presence of conditions (a), (b) or (c).

Another feature of this invention is to provide selector means, such as selector switches, which are operative in response to the sensed error condition for supplying to averaging circuitry the appropriate data words from which corrected data words are derived.

Yet another feature of this invention is to provide switching means for selectively switching into respective stages of the data word register either the data word which is stored in a preceding stage or a corrected data word derived by the averaging circuitry. Such switching means are used when condition (c) is sensed to retain in, for example, the fourth stage of the data word register that word which was stored previously therein.

BRIEF DESCRIPTION OF THE DRAWINGS

The following detailed description, given by way of example and not intended to limit the present invention solely to the described embodiments, will best be understood in conjunction with the accompanying drawings in which:

FIGS. 1A–1C are schematic representations of a data block and the manner in which an interleaved data block is formed therefrom;

FIGS. 2A and 2B are schematic representations of the effect of burst errors on de-interleaved data words;

FIG. 3 is a block diagram of a recording system in which the present invention finds ready application;

FIGS. 4A and 4B are block diagrams of one embodiment of error correcting apparatus in accordance with the present invention;

FIG. 5 is a table which represents error correcting techniques which are used for respectively different error conditions;

FIG. 7 is a block diagram of another embodiment of error correcting apparatus in accordance with the present invention;

FIG. 8 is a table similar to that shown in FIG. 5 and useful with the embodiment shown in FIG. 7; and FIGS. 9A–9E are timing diagrams which are useful in understanding the operation of the embodiment shown in FIG. 7.

DETAILED DESCRIPTION OF CERTAIN PREFERRED EMBODIMENTS

Figures 4B, 5:
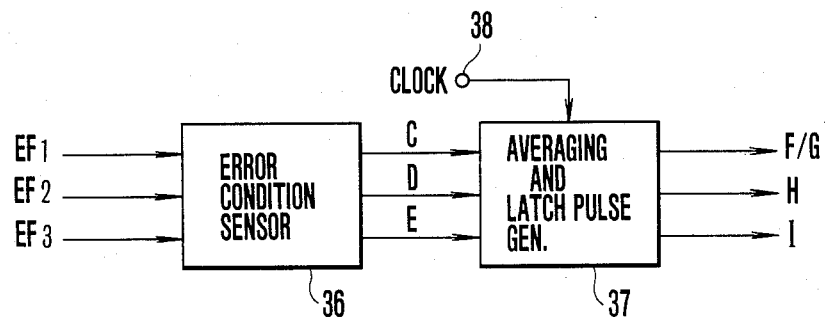

The error correcting technique described herein is particularly useful in conjunction with an error-correction code, such as a time-interleaved code; although the use of this code is not necessary to carry out the present invention. In one form of time-interleaving, data blocks formed of a plurality of data words are time-interleaved to form an interleaved block. The word configuration of such an interleaved block is formed of, for example, the first word of the first data block, followed by the first word of the second data block, followed by the first word of the third data block, and so on. After the first word of the last data block is provided, the next word consists of the second word of the first data block followed by the second word of the second data block, and so on. In this interleaved block, adjacent words from the same block are separated from each other by a number of data words, this number being equal to the number of data blocks which are interleaved. An advantage of such an interleaved coding technique is that it reduces the size of the error which might appear in a particular data block. For example, in an interleaved block, let it be assumed that adjacent words are separated from each other by ten words which are derived from ten separate data blocks. If the interleaved data block is transmitted or recorded serially by word, then an error which affects, for example, up to ten successive words in the interleaved block will, after de-interleaving, affect only one data word in each data block. Depending upon additional error correcting codes which also may be used, such as parity codes, an erroneous data word in a data block can be corrected or compensated as a function of the correct words in that block. Even if complicated additional error correcting codes are not used, a single erroneous data word can be approximated by averaging the data words which precede and follow that erroneous word. Still further, and as described herein, if the burst error which affects the inleaved block is sufficiently long so as to affect, for example, twenty interleaved words in that block, only two successive data words in a de-interleaved original data block will be affected. If these two erroneous words are preceded and followed, respectively, by correct data words, the erroneous words may be approximated by a technique described herein as the "thrice averaging" technique.

The foregoing averaging techniques result in good approximations of original data words especially if such data words are representative of audio or video information, or other information which varies relatively slowly with time.

Referring now to FIG. 1A, there is schematically illustrated a representation of an original data block formed of successive data words $D_0, D_1, \ldots D_{3n}$, $D_{3n+1}$ and $D_{3n+2}$. This single data block may be re-formatted as an interleaved data block in and of itself, without interleaving thereinto the data words of other data blocks. As shown in FIG. 1B, the data block may be reconfigured as sub-blocks I, II and III, respectively. Each of these sub-blocks is comprised of every third data word in the original data block. Thus, sub-block I is formed of every third data word $D_0, D_3, \ldots D_{3(k-1)}$, $D_{3k}, \ldots D_{3(n-1)}$ and $D_{3n}$. Sub-block II is formed of data words $D_1, D_4, \ldots D_{3(k-1)+1}, D_{3k+1}, \ldots D_{3(n-1)+1}$ and $D_{3n+1}$. Finally, sub-block III is formed of data words $D_2, D_5, \ldots D_{3(k-1)+2}, D_{3k+2}, \ldots D_{3(n-1)+2}$ and $D_{3n+2}$. It is appreciated that these sub-blocks may be formed by writing the data words included in the data block shown in FIG. 1A into suitable addressable locations of a random access memory (RAM).

The time-interleaved block shown in FIG. 1C may be produced by reading out from the aforementioned RAM all of the data words included in sub-block I followed by all of the data words included in sub-block II followed by all of the data words included in sub-block III. It is recognized that adjacent words of the original data block are separated from each other by n data words, these n data words being equal to the effective length of a sun-block. Adjacent words included in the interleaved block shown in FIG. 1C are seen to be every third word of the original data block. That is, in sub-block I included in the interleaved block of FIG. 1C, data words $D_0$ and $D_3$ are adjacent each other, as are data words $D_3$ and $D_6$. Likewise, in sub-block II, data words $D_1$ and $D_4$ are adjacent each other, as are data words $D_4$ and $D_7$. Finally, in sub-block III of the interleaved block shown in FIG. 1C, data words $D_2$ and $D_5$ are adjacent each other, as are data words $D_5$ and $D_8$.

The interleaved block shown in FIG. 1C is intended to be transmitted or recorded. It is appreciated that errors, referred to as burst errors, may distort one or more, or even several, of the interleaved data words included in the interleaved block. In fact, the burst errors may be sufficiently long so as to distort or destroy all of the data words included in one or even two sub-blocks. If the burst error is of sufficient length (or duration) so as to distort sub-block I, for example, then, upon recovering and de-interleaving the interleaved block, the original data block shown in FIG. 1A will be re-formed, but every data word that had been included in sub-block I will be erroneous. FIG. 2A is a schematic representation of the re-formed data block wherein each erroneous data word (recovered from sub-block I) is represented by an "x", and each correct data word (recovered from sub-blocks II and III) is represented by a "o". It is seen that, when the burst error is of sufficient length to destroy only one sub-block, the de-interleaved data words will appear as an erroneous data word following every two correct data words, shown clearly in FIG. 2A.

Erroneous data words due to a burst error whose length does not extend one-third of the length of an interleaved block (i. e. erroneous data words of the type shown in FIG. 2A) may be corrected, or compensated, by the so-called "once averaging" technique. It is recalled that the digital data words described herein are used to represent audio or video information, or other information which varies relatively slowly with time. Hence, the information represented by the erroneous data word $D_{3k}$ (wherein $k=0, 1, 2, \ldots$) may be closely approximated by interpolation. That is, a compensated value of data word $D_{3k}$ may be closely approximated by averaging the correct data words which precede $(D_{3(k-1)+2})$ and follow $(D_{3k+1})$ erroneous data word $D_{3k}$. The compensated, or interpolated, data word $\overline{D_{3k}}$ may be mathematically expressed as follows:

$$\overline{D_{3k}} = \frac{[D_{3(k-1)+2}] + [D_{3k+1}]}{2}$$

If the burst error is of sufficient duration so as to distort or destroy two-thirds of the interleaved data block, for example, if the burst error destroys the data words included in sub-blocks I and II, the original data block, when re-formed, will appear as shown schematically in FIG. 2B. As a result of this burst error, two successive data words and ($D_{3k}$ and $D_{3k+1}$) are erroneous, but the preceding data word ($D_{3(k-1)+2}$) and the following data word ($D_{3k+2}$) both are correct. Here, the two successive erroneous data words may be compensated by approximating their values by means of the so-called "thrice averaging" technique. In accordance with this technique, the correct preceding and following data words included in the recovered data block are averaged to produce what is referred to herein as a "pseudo interpolated" word. In one arrangement, this pseudo interpolated word then is averaged with the following data word ($D_{3k+2}$) to derive a compensated data word which closely approximates the original value of data word $D_{3k+1}$. Then, this compensated data word $D_{3k+1}$ is averaged with the correct preceding data word ($D_{3(k-1)+2}$) to derive another compensated data word which closely approximates the original value of data word $D_{3k}$. In an alternative arrangement, the pseudo interpolated word is averaged with the preceding correct data word ($D_{3(k-1)+2}$) to derive a compensated data word which closely approximates the original value of data word $D_{3k}$. Then, this compensated data word $D_{3k}$ is averaged with the correct following data word $D_{3k+2}$ to derive another compensated data word which closely approximates the original value of data word $D_{3k+1}$.

In the thrice averaging technique, three averaging operations are carried out, using the correct preceding and following data words, to compensate for the two successive erroneous data words. This thrice averaging technique may be mathematically expressed in accordance with the following equations, wherein X represents the pseudo interpolated word, $D_{3k}$ represents the compensated data word $D_{3k}$ and $D_{3k+1}$ represents the compensated data word $D_{3k+1}$:

$$X = \frac{[D_{3(k-1)+2}] + [D_{3k+2}]}{2}$$

-continued
$$\overline{D_{3k+1}} = \frac{X + [D_{3k+2}]}{2}$$

$$\overline{D_{3k}} = \frac{\overline{D_{3k+1}} + [D_{3(k-1)+2}]}{2}$$

The alternative arrangement mentioned above for carrying out the thrice averaging technique may be mathematically expressed as follows:

$$X = \frac{[D_{3(k-1)+2}] + [D_{3k+2}]}{2}$$

$$\overline{D_{3k}} = \frac{[D_{3(k-1)+2}] + X}{2}$$

$$\overline{D_{3k+1}} = \frac{\overline{D_{3k}} + [D_{3k+2}]}{2}.$$

It is appreciated that the once averaging technique and the thrice averaging technique provide more accurate approximations in compensating for the erroneous data words wherein the burst error is of a duration up to one-third and up to two-thirds, respectively, of the length of an interleaved block. It is, accordingly, desirable to utilize such once averaging and thrice averaging compensation techniques, wherever possible, rather than the aforementioned "previous value hold" technique. However, for burst errors of durations greater than two-thirds of the length of an interleaved block, the previous value hold compensation technique should be used. This is because the number of successive erroneous data words which are re-formed from the interleaved block is too large for once averaging or thrice averaging compensation. It will be recognized, however, that, once previous value hold compensation is carried out, it is highly likely that the next-following compensation technique will be the thrice averaging technique. This can be explained as follows: let it be assumed that the interleaved block is formed by interleaving three sub-blocks. Upon de-interleaving, let it be assumed that, merely as an example, data word $D_5$ is correct but data words $D_6$, $D_7$ and $D_8$ all are erroneous. Let it be further assumed that the next-following data word $D_9$ also is correct. Since three successive data words ($D_6 D_7 D_8$) are erroneous, neither the once averaging nor the thrice averaging compensation technique can be utilized to correct any of these three data words at this time. Hence, the previous value hold compensation technique must be used, and data word $D_6$ is compensated by re-using data word $D_5$ therefor. It is assumed, with this compensation, that data word $D_6$ now is correct. Therefore, since data words $D_6$ and $D_9$ are correct but intermediate data words $D_7$ and $D_8$ remain erroneous, these intermediate words $D_7$ and $D_8$ may be corrected by the aforementioned thrice averaging technique utilizing preceding and following data words $D_6$ and $D_9$ in the manner discussed above.

One embodiment of a system wherein the present invention finds ready application is illustrated in FIG. 3. Merely for purposes of explanation, the system illustrated in FIG. 3 is a recording system wherein input information, such as audio information, is recorded in digital form. It is assumed that the input information already is comprised of digital data words; and as an example, the illustrated recording system may comprise a so-called audio PCM recorder. This recorder is adapted to record and subsequently play back digital signals (e.g. audio PCM, digitized video signals, or the like) on a magnetic tape. The system is comprised of an input terminal 1 to which successive digital words, such as the digital words shown in FIG. 1A, are applied, these digital words representing audio or video information; a random access memory (RAM) 2, an error correction code generator 3, magnetic recording apparatus 4, a random access memory (RAM) 6 and an error compensating circuit 9. RAM 2 is coupled to input terminal 1 and is adapted to store therein at least one data block of the type shown schematically in FIG. 1A. RAM 2 is coupled to an address generator 5 to receive write-in addresses which determine the particular locations in RAM 2 at which the successive data words are written. Preferably, these data words are written at locations whereby the sub-blocks shown in FIG. 1B are formed. The purpose of RAM 2 is to interleave the data words supplied thereto from input terminal 1 so as to create the interleaved block shown in FIG. 1C from the supplied data block shown in FIG. 1A. It is appreciated that this interleaved block may be formed by controlling the write-in and read-out addresses supplied by address generator 5 to RAM 2.

The output of RAM 2 is coupled to magnetic recording apparatus 4 via error correction code generator 3. The error correction code generator may be of the type adapted to generate the CRC code, whereby each interleaved block, or each sub-block included in each interleaved block, is provided with an error correction code (e.g. a CRC code word) appended thereto. The interleaved block, including the error correction code words included therein, are recorded on a magnetic medium, such as magnetic tape, by magnetic recording apparatus 4. In one embodiment, the magnetic recording apparatus may be of a type normally used in video tape recorders (VTRs) by which one or more rotary magnetic heads are used to record information in successive parallel, skewed tracks. When used to record video signals, each track has a video field interval recorded therein; and when used to record audio PCM signals, each track may have an interleaved block recorded therein. Hence, each interleaved block is processed as if it was a video field interval.

The reproducing section of magnetic recording apparatus 4 is coupled to RAM 6, this RAM being the complement of RAM 2 and functioning to de-interleave the data words that had been recorded as the interleaved block shown in FIG. 1C. RAM 6 is coupled to address generator 5 and receives write-in addresses therefrom so as to write the interleaved data words which are reproduced from the magnetic medium into appropriate storage locations of the RAM. The output of RAM 6 is coupled to error compensating circuitry 9, described in greater detail below. It will be appreciated that RAM 6 is controlled, during a read-out operation, in response to read addresses supplied thereto by address generator 5. These read addresses serve to de-interleave the data words which had been written into RAM 6.

The apparatus shown in FIG. 3 also includes an error detector 7 and a random access memory (RAM) 8. It will be recognized that, by reason of the error correction code which accompanies the interleaved data blocks recorded by magnetic recording apparatus 4, the presence of an error in a sub-block (i.e. one or more of the sub-blocks shown in FIG. 1C) may be detected by conventional error detecting circuitry. For example, if an error correction code accompanies a sub-block, error detector 7 is adapted to sense whether an error is present in that sub-block. If so, then every data word included in that sub-block is interpreted as being erroneous. This is achieved by accompanying each data word with an error flag, this flag being set to a binary "1" in the event that the data word is viewed as being erroneous; and the error flag being reset to a binary "0" when the data word is viewed as being correct. Hence, error detector 7 functions to set or reset the error flags associated with each data word that is reproduced by apparatus 4. Consequently, the presence of an error condition in the reproduced data word may be sensed.

Error detector 7 is coupled to RAM 8, the latter functioning as an error flag memory. The purpose of this error flag memory is to store the error flags which are associated with the de-interleaved data words produced by RAM 6. Thus, RAMS 6 and 8 both may be responsive to the write and read addresses generated by address generator 5 so as to de-interleave the inter-leaved data words reproduced from a magnetic medium and, concurrently, de-interleave the error flags associated with those words. Thus, RAM 8 indicates which of the data words included in a re-formed data block are erroneous. Stated otherwise, RAM 8 functions to indicate which of the data words illustrated in FIGS. 2A and 2B should be represented as "x" and which should be represented as "o". The error flags stored in RAM 8 are coupled to error compensator 9 for the purpose of compensating for erroneous data words, as will be described. The output of error compensator 9 is coupled to an output terminal 10, whereby corrected data words are provided.

In operation, successive data words are supplied to RAM 2 via input terminal 1. These successive data words appear as shown schematically in FIG. 1A. Under the control of write addresses supplied thereto by address generator 5, RAM 2 stores these data words in, for example, sub-block configurations of the type shown in FIG. 1B. After a complete data block is stored, address generator 5 supplies read addresses to RAM 2 to read out sub-blocks I, II and III, in succession, as shown in FIG. 1C. Thus, the data words included in the data block shown in FIG. 1A are time-interleaved so as to form the interleaved block shown in FIG. 1C. This interleaved block is supplied to recording apparatus 4 via error correction code generator 3, thereby adding, for example, a CRC code word to each of the sub-blocks shown in FIG. 1C. The interleaved block, including the error correction code words added thereto, is recorded on the magnetic medium.

Subsequently, the interleaved block, including the added error correction code words, is reproduced from the magnetic medium. The reproduced interleaved block is supplied to RAM 6 and also to error detector 7. Under the control of write addresses supplied thereto by address generator 5, RAM 6 writes the interleaved data words into respective storage locations analogous to that shown in FIG. 1B. Concurrently, each sub-block included in the reproduced interleaved block is detected by error detector 7 to ascertain the presence of an error condition in such sub-blocks. As mentioned above, this error detection operation is carried out by a so-called CRC check circuit of a type known to those of ordinary skill in the art. Upon detecting an error in a sub-block, the error flags which accompany all of the data words included in that sub-block are set to a binary "1", thus indicating the presence of an error condition.

Hence, each data word included in that sub-block is interpreted as being erroneous. If an error condition is not detected for a sub-block, the error flags associated with the data words included in that sub-block remain reset to a binary "0".

The error flags, which are set or reset by error detector 7 in the manner described above, are written into storage locations of RAM 8 in response to the same write addresses that are supplied to RAM 6. Thus, as each interleaved data word is written into a storage location in RAM 6, its associated error flag is written into a corresponding storage location in RAM 8.

After the interleaved block has been written into RAM 6, and the associated error flags which accompany the data words included in that interleaved block are written into RAM 8, address generator 5 supplies read addresses to RAM 6 (and also to RAM 8) to read out the data words to re-form the same sequence of the original data block shown in FIG. 1A. Hence, the data words which had been written into RAM 6 are de-interleaved and read out therefrom. At the same time, the error flags which accompany such data words are read out of RAM 8. Thus, the original sequence of data words is recovered from RAM 6 and supplied to error compensator 9.

The error compensator is described in greater detail hereinbelow. Suffice it to say that the error flags which accompany the de-interleaved data words are used to sense various error conditions that may be present. For example, one of the following error conditions may be sensed: (a) an erroneous data word preceded and followed, respectively, by correct data words, such as represented schematically in FIG. 2A. It is recognized that this error condition is sensed as a function of the error flags which accompany these data words. (b) Another error condition that may be sensed is the presence of plural successive erroneous data words preceded and followed, respectively, by correct data words, such as represented schematically in FIG. 2B. (c) Yet another error condition which may be sensed is the presence of a predetermined number of successive erroneous data words preceded by a correct data word, such as described hereinabove in conjunction with the previous-hold compensation technique. Of course, a no-error condition may be sensed whereby all of the successively read out data words are detected as being correct. Depending upon the sensed error condition (a), (b) or (c), a respective one of three different types of error compensation techniques is utilized to correct the sensed error condition. For example, if error condition (a) is sensed, error compensator 9 is controlled to carry out the once averaging technique. If error condition (b) is sensed, the error compensator is controlled to carry out the thrice averaging technique. Finally, if error condition (c) is sensed, error compensator 9 is controlled to carry out the previous value hold technique.

One embodiment of error compensator 9 is illustrated in FIG. 4A. This error compensator is comprised of a data word register, an error flag register, an averaging circuit, selector circuits and switch circuits. In one example, the data word register is comprised of latch circuits 16, 17, 18 and 19, each adapted to store a respective data word therein. Each latch circuit may be of the type wherein a data word supplied thereto is stored, or "latched" in response to a latch, or shift, clock pulse supplied thereto. For a purpose soon to be described, latch circuit 16 is supplied with a latch clock A, latch circuit 17 is supplied with a latch clock H, latch circuit 18 is supplied with a latch clock I and latch circuit 19 is supplied with latch clock A. The latch circuits may be viewed as a shift register for storing four successive data words, the first stage, referred to herein as latch circuit 16, being coupled to an input terminal 12 to receive the successive, de-interleaved data words read out from RAM 6 (FIG. 3).

The error flag register is adapted to store the error flags which accompany the data words stored in the data register. In particular, the error flag register is comprised of latch circuits 13, 14 and 15 which store the error flags that accompany the data words stored in latch circuits 16, 17 and 18, respectively. Here too, latch circuits 13, 14 and 15 comprise a shift register, and each stage of this shift register is constituted by a respective latch circuit supplied with latch clock A. The first stage of the error flag register is coupled to an input terminal 11 to receive the de-interleaved error flags that are read out of RAM 8 concurrently with the reading out of the de-interleaved data words from RAM 6. Although not shown herein, it will be explained below that, in the event that an error flag stored in a particular error flag latch circuit is indicative of an erroneous data word (i.e. if the error flag is set to a binary "1"), once that data word is corrected, the condition of the error flag is changed over to represent a correct condition (i.e. it is changed over to a binary "0").

The averaging circuit used in the embodiment shown in FIG. 4A may be a conventional digital averaging circuit 20 which is supplied with two data words and is adapted to produce an interpolated word whose value is substantially equal to the average of such supplied words. Averaging circuit 20 is coupled to receive averaging pulses supplied thereto. These averaging pulses are generated by a suitable pulse generator (described with reference to FIG. 4B) and function to enable the averaging circuit to produce an interpolated word in response to each such pulse.

The selector circuits used in the embodiment shown in FIG. 4A are comprised of selector circuits 22 and 25. These selector circuits may be constructed as multiplexer circuits, each having a pair of inputs and an output coupled to averaging circuit 20. The inputs of selector circuit 22 are coupled to latch circuits 16 and 17, respectively; and the inputs of selector circuit 25 are coupled to latch circuits 18 and 19, respectively. A control signal (not shown) is coupled to selector circuits 22 and 25 to control which input of each should be coupled to the output thereof. Thus, depending upon this control signal, selector circuit 22 supplies to averaging circuit 20 the data words stored in latch circuit 16 or the data words stored in latch circuit 17. Likewise, depending upon this control signal, selector circuit 25 supplies to averaging circuit 20 the data words stored in latch circuit 18 or the data words stored in latch circuit 19.

The switch circuits used in the embodiment shown in FIG. 4A include switch circuits 21, 23 and 24, each switch circuit being constructed as a multiplexer and each being similar to, for example, selector circuit 22. Switch circuit 21 includes a pair of inputs coupled to latch circuit 16 and to the output of averaging circuit 20, respectively. The output of switch circuit 21 is coupled to latch circuit 17. Switch circuits 23 and 24 function as a 3-way multiplexer whereby switch circuit 24 includes a pair of inputs coupled to averaging circuit 20 and to latch circuit 19, respectively, and switch circuit 23 includes a pair of inputs coupled to latch circuit 17 and to switch circuit 24, respectively. The combination of switch circuits 23 and 24 selectively supplies to latch circuit 18 the data words stored in latch circuit 17 or the interpolated word produced by averaging circuit 20 or the data words stored in latch circuit 19. Suitable control signals (not shown) are supplied to switch circuits 21, 23 and 24 to determine the particular switching arrangement thereof.

The embodiment of FIG. 4A also includes a clear pulse generator 35. This clear pulse generator is coupled to error flag latch circuit 15 and functions to change over the error indication provided by the error flag included in that latch circuit in the event that the data word stored in latch circuit 17 is corrected prior to being shifted into latch circuit 18. If this change over is not effected, it is recognized that the error flag that would be shifted into error flag latch circuit 15 from error flag latch circuit 14 concurrently with the shifting in of the corrected data word from latch circuit 17 into latch circuit 18 would be a binary "1" and thus would falsely indicate that the data word stored in latch circuit 18 is erroneous. Since this data word had been corrected before being shifted into latch circuit 18, the error flag associated therewith should be changed over. Clear pulse generator 35 is responsive to, for example, a binary "1" stored in error flag latch circuit 14 coincidentally with a binary "0" stored in error flag latch circuit 13.

Before describing the operation of the error compensator shown in FIG. 4A, reference is made to FIG. 5 which is a table representative of the types of error compensation techniques that are carried out in response to respectively detected error conditions. In the table of FIG. 5, the designations $EF_1$, $EF_2$ and $EF_3$ represent the error flags stored in error flag latch circuits 13, 14 and 15, respectively. As shown, when all of the error flags are reset, no compensation is carried out on the data words stored in the data word register. When the error flag stored in the first stage 13 is set to a binary "1" but the remaining error flags are reset, here too no compensation is carried out. However, if the data word stored in latch circuit 16 is erroneous, as represented by $EF_1 = "1"$, then, when this data word is shifted into latch circuit 17, as upon the occurrence of the following shift clock pulse, the data word now stored in latch circuit 17 will be erroneous ($EF_2 = "1"$), but the data words stored in latch circuits 16 and 18 are assumed to be correct ($EF_1 = EF_3 = "0"$). On detecting this condition, as by detecting the states of the error flags stored in the error flag register, wherein an erroneous data word is both preceded and followed by correct data words, the once averaging compensation technique is utilized to correct the data word stored in latch circuit 17. Thus, and as will be described, the erroneous data word in latch circuit 17 is replaced by an interpolated data word produced by averaging circuit 20. Upon the occurrence of the next shift clock pulse, this compensated data word will be shifted from latch circuit 17 to latch circuit 18. At that time, clear pulse generator 35 effectively loads error flag latch circuit 15 with a reset error flag ($EF_3 = "0"$) rather than allowing the error flag stored in latch circuit 14 ($EF_2 = "1"$) to be shifted thereinto.

Returning to the table shown in FIG. 5, if erroneous data words are stored in latch circuits 16 and 17 but a correct data word is stored in latch circuit 18 ($EF_1 = EF_2 = "1"$ and $EF_3 = "0"$), no compensation is carried out. However, if the contents of these latch circuits are shifted respectively to the next succeeding latch circuits, and if a correct data word now is shifted into latch circuit 15 (whereby $EF_1="0"$ and $EF_2=EF_3="1"$), then the thrice averaging compensation technique is carried out.

In all of the foregoing examples, it has been assumed that a correct or compensated data word always is shifted into latch circuit 19. This will become apparent from the discussion of the operation of the embodiment shown in FIG. 4A. If only the data word stored in latch circuit 19 is correct ($EF_1=EF_2=EF_3="1"$), then the previous value hold compensation technique is carried out. It will be recognized that this previous value hold compensation is repeated in successive time periods when successive erroneous data words are shifted into the illustrated data word register until a correct data word is shifted into latch circuit 16. At that time, the data word stored in latch circuit 16 will be correct, the data word stored in latch circuit 19 is assumed to be correct by reason of the previous value hold compensation, and the data words stored in latch circuits 17 and 18 both are erroneous. Hence, as discussed above, and as shown by the table of FIG. 6, the thrice averaging compensation technique now is carried out.

The operation of the error compensator shown in FIG. 4A now will be described with reference to the timing diagrams illustrated in FIGS. 6A–6I. The shift clock pulses which are supplied to the latch circuits comprising the error flag register as well as to latch circuits 16 and 19 are illustrated in FIG. 6A. These shift clock pulses define successive time periods ($T_1, T_2, \ldots T_{10}$) at the beginning of which ($t_1, t_2, \ldots t_{10}, t_{11}$) the contents of the error flag register and the contents of the data word register are shifted by one stage. In order to simplify the description herein, it is assumed that the contents of the error flag register as well as the contents of the data word register are shifted by one stage to the right, as viewed in FIG. 4A. FIG. 6B represents error flags $EF_1$, $EF_2$ and $EF_3$, respectively, shifted through latch circuits 13, 14 and 15 of the error flag register. From error flag $EF_1$, it is assumed that, for the data words here under consideration, the first data word is erroneous, the second is correct, the third and fourth data words both are erroneous, the fifth is correct, the sixth, seventh and eighth data words all are erroneous, and the ninth and tenth data words both are correct. The timing waveform of error flag $EF_2$ indicates that the contents of latch circuit 13 merely are shifted into latch circuit 14 at successive shift clock pulses. By reason of clear pulse generator 35, it should be understood that the contents of latch circuit 14 are not necessarily shifted into latch circuit 15 at successive shift clock pulses. The lower three arrows in FIG. 6B indicate those error flags which would have been shifted into latch circuit 15 but for the operation of clear pulse generator 35. This will be described in greater detail below. FIG. 6C illustrates the waveform produced by suitable gating means when error condition (a) is detected. That is, when the data word stored in latch circuit 17 is erroneous, but this data word is preceded and followed by data words which are correct, that is, when the data words stored in latch circuits 16 and 18 are correct, the waveform shown in FIG. 6C is a binary "1". Likewise, error condition (b) is detected when the error words stored in latch circuits 17 and 18 are erroneous and the data word stored in latch circuit 16 is correct. As mentioned above, it is assumed that the data word stored in latch circuit 19 always is correct. Thus, the waveform shown in FIG. 6D is a binary "1" when $EF_2=EF_3="1"$ and $EF_1="0"$. Finally, error condition (c) is detected when all of the data words stored in latch circuits 16, 17 and 18 are erroneous. Accordingly, the waveform shown in FIG. 6E is a binary "1" when $EF_1=EF_2=EF_3="1"$.

It is appreciated that the waveforms shown in FIGS. 6C, 6D and 6E may be produced by suitable gating circuits which are supplied with error flags $EF_1$, $EF_2$ and $EF_3$. In addition, a suitable clock generator (not shown) may be provided to generate a number of relatively narrow clock pulses of relatively higher frequency during each shift clock period. That is, during each period defined by the shift clock pulses shown in FIG. 6A, a number of such higher frequency clock pulses may be generated. These clock pulses are utilized to produce the averaging pulses F or G which are supplied to averaging circuit 20. FIG. 6F illustrates one averaging pulse during each shift clock period, and FIG. 6G illustrates three averaging pulses during each shift clock period. When the waveform of FIG. 6C is a binary "1", averaging pulses F, that is, the averaging pulses illustrated in FIG. 6F, are supplied to averaging circuit 20. When the waveform illustrated in FIG. 6D is a binary "1", averaging pulses G, that is, the averaging pulses illustrated in FIG. 6G, are supplied to the averaging circuit. It is appreciated that suitable gates may be used to supply averaging pulses F or G to averaging circuit 20. The averaging circuit functions to carry out an averaging operation in response to the negative transition in each averaging pulse supplied thereto.

Latch circuit 17 is supplied with latch pulses H shown in FIG. 6H, and latch circuit 18 is supplied with latch pulses I shown in FIG. 6I. The purpose of the latch pulses is to enable the latch circuit to which such pulses are supplied to "latch" the data word then supplied thereto. Latch pulses H may be generated in response to shift clock pulse A, the waveforms shown in FIGS. 6C and 6D, and averaging pulses F and G by means of suitable inverters, gating circuits and a counter. Similarly, latch pulses I may be produced in response to shift clock pulse A, the waveforms illustrated in FIGS. 6D and 6E and averaging pulses F and G by means of inverters, gating circuits and a counter. Alternatively, a conventional microprocessor may be programmed to produce the latch pulses shown in FIGS. 6H and 6I. In any event, it will be appreciated by those of ordinary skill in the art that latch pulses H and I may be produced readily and without undue experimentation.

A block diagram representing circuitry by which the waveforms shown in FIGS. 6C–6I are generated is illustrated in FIG. 4B. This circuitry is comprised of an error condition sensor 36 which receives the error flags $EF_1$, $EF_2$ and $EF_3$ and, in response to such error flags, generates the waveforms shown in FIGS. 6C, 6D and 6E. As mentioned above, when waveform 6C is a binary "1", the once averaging technique is carried out. When waveform 6D is a binary "1", the thrice averaging technique is carried out. When waveform 6E is a binary "1", the previous value hold technique is carried out. The waveforms shown in FIGS. 6C, 6D and 6E, as produced by error condition sensor 36, are supplied to an averaging and latch pulse generator 37 together with the aforementioned higher frequency clock pulses which are supplied thereto by way of an input 38. Depending upon which of the waveforms 6C, 6D and 6E is produced, averaging pulses F or G are generated.

Then, depending upon whether averaging pulses F or G are produced, in conjunction with which of waveforms 6C, 6D and 6E is a binary "1", latch pulses H and I are generated, as illustrated in FIGS. 6H and 6I, respectively.

Let it be assumed that, at time $t_1$, the data words stored in latch circuits 17, 18 and 19 are correct and the data word now shifted into latch circuit 16 is erroneous. In accordance with this assumption, $EF_1$="1" and $EF_2$=$EF_3$="0". From the table shown in FIG. 5, no compensation is carried out at this time. At time $t_2$, in response to the next shift clock pulse shown in FIG. 6A, the erroneous data word stored in latch circuit 16 is shifted into latch circuit 17, and the correct data words which had been stored in latch circuits 17 and 18 now are shifted into latch circuits 18 and 19, respectively. It is assumed, for the purpose of the present discussion, that the data word now shifted into latch circuit 16 is correct. Thus, error condition (a) is detected, whereby $EF_2$="1" and $EF_1$=$EF_3$="0". That is, the data word stored in latch circuit 17 is erroneous, but this erroneous data word is preceded and followed, respectively, by correct data words. As a result, the waveform shown in FIG. 6C is a binary "1". As a result of this waveform, selector circuit 22 is controlled to supply the correct data word stored in latch circuit 16 to averaging circuit 20, and selector circuit 25 is controlled to supply to averaging circuit 20 the correct data word stored in latch circuit 18. Also, as a result of this waveform shown in FIG. 6C, the averaging circuit is supplied with the single averaging pulse F during shift clock period $T_2$.

Now, in response to the negative transition in averaging pulse F, the data words in latch circuits 16 and 18 are averaged by the averaging circuit, resulting in an interpolated data word that is supplied to switch circuit 21. This switch circuit is controlled by the waveform shown in FIG. 6C to supply to latch circuit 17 the interpolated data word produced by averaging circuit 20. At this time, switch circuit 23 also is controlled by the waveform shown in FIG. 6C to couple the input of latch circuit 18 to the output of latch circuit 17.

During shift clock period $T_2$, latch pulse H undergoes a positive transition which approximately coincides with the positive transition in averaging pulse F. As a result of this positive transition, latch circuit 17 is enabled to store therein the data word supplied thereto. Since switch circuit 21 supplies to latch circuit 17 the interpolated data word produced by averaging circuit 20, it is seen that the erroneous data word which had been stored previously in this latch circuit now is replaced by the interpolated data word produced by the averaging circuit. Thus, all of the data words now stored in the data register are correct.

At time $t_3$, the beginning of the next shift clock period $T_3$, the error flag which had been stored in error flag latch circuit 14 should be shifted into latch circuit 15. However, since the data word stored in latch circuit 17 had been corrected, and since $EF_2$="1", this error flag should not be shifted, as is, into latch circuit 15. Clear pulse generator 35 is responsive to $EF_1$="0" and $EF_2$="1" to prevent the error flag which had been stored in latch circuit 14 from now being shifted into latch circuit 15. This is represented by the waveform shown in broken lines for $EF_3$ during shift clock period $T_3$, thus indicating that, although error flag $EF_2$ should have been shifted into latch circuit 15, the fact that the data word associated with this error flag had been corrected means that this error flag is not shifted. Hence, the error flag stored in latch circuit 15 remains reset as a binary "0".

At time $t_3$, the next data word is shifted into latch circuit 16, and the contents that had been stored previously in latch circuits 16, 17 and 18 now are shifted into latch circuits 17, 18 and 19, respectively. It is assumed herein that the data word now shifted into latch circuit 16 at time $t_3$ is erroneous. Thus, the error flag shifted into latch circuit 13 is set to a binary "1" as illustrated in FIG. 6B. During shift clock period $T_3$, switch circuits 21 and 23 are controlled so as to couple the data words stored in latch circuits 16 and 17 to latch circuits 17 and 18, respectively, in response to the next shift clock pulse at time $t_4$. The operation of selectors 22 and 25 during shift clock period $T_3$ thus has no effect.

At time $t_4$, it is assumed that the next data word shifted into latch circuit 16 is erroneous. Thus, at times $t_3$ and $t_4$, two successive erroneous data words are shifted into the data word register. During shift clock period $T_4$, switches 21 and 23 remain in their previous conditions, and the operating conditions of selectors 22 and 25 here too have no effect.

It now is assumed that, at shift clock time $t_5$, a correct data word is shifted into latch circuit 16. Thus, the successive data words which had been received by the data word register at times $t_2$, $t_3$, $t_4$ and $t_5$ are seen to be correct, erroneous, erroneous and correct, respectively. Since two successive data words had been preceded and followed by correct data words, error condition (b) is detected. It is observed that, at time $t_5$, error flag $EF_1$="0" and error flags $EF_2$=$EF_3$="1". From the table of FIG. 5, it is seen that the thrice averaging compensation technique now should be carried out. This is indicated by the binary "1" of waveform 6D.

In carrying out the thrice averaging compensation operation, selectors 22 and 25 initially are controlled in response to the waveform shown in FIG. 6D to supply to averaging circuit 20 the correct data words stored in latch circuits 16 and 19. Also, averaging circuit 20 now is supplied with averaging pulses G, shown in FIG. 6G. In response to the negative transition of the first of these averaging pulses, averaging circuit 20 produces a pseudo interpolated word derived from the average of the data words supplied thereto from latch circuits 16 and 19. Switch circuits 23 and 24 are controlled by the waveform shown in FIG. 6D to supply this pseudo interpolated word to latch circuit 18.

It is seen from FIG. 6I that, during shift clock period $T_5$, latch circuit 18 is supplied with latch pulse I having a positive transition that substantially coincides with the positive transition of the first averaging pulse shown in FIG. 6G. Thus, latch circuit 18 is enabled by this positive transition in latch pulse I to temporarily store therein the pseudo interpolated word produced by averaging circuit 20. Now, selector 25 is controlled to change over its condition, whereupon the pseudo interpolated word stored in latch circuit 18 is supplied to averaging circuit 20 together with the correct data word stored in latch circuit 16. The averaging circuit now responds to the second negative transition in averaging pulses G during the shift clock period $T_5$ to produce an interpolated data word. Switch 21 is controlled to supply this interpolated data word from averaging circuit 20 to latch circuit 17.

As illustrated in FIG. 6H, during the shift clock period $T_5$, latch clock pulse H undergoes a positive transition which substantially coincides with the positive transition of the second averaging pulse G. Latch circuit 17 responds to this positive transition of latch clock pulse H to store therein the interpolated data word which now is supplied thereto from averaging circuit 20 by switch 21. Thus, the erroneous data word which had been stored previously in latch circuit 17 now is replaced by the interpolated data word produced by averaging circuit 20.

Now, the condition of selector 22 is changed over so as to supply to averaging circuit 20 the interpolated data word which has just been stored in latch circuit 17. The condition of selector 25 also is changed over, thereby supplying to averaging circuit 20 the correct data word stored in latch circuit 19. The averaging circuit responds to the third negative transition of averaging pulses G so as to average the interpolated data word supplied from latch circuit 17 and the correct data word supplied from latch circuit 19 to produce yet another interpolated data word. Switches 23 and 24 are controlled (in response to the binary "1" of waveform 6D) to supply this other interpolated data word produced by averaging circuit 20 to latch circuit 18.

Now, latch circuit 18 responds to the next positive transition of latch clock pulse I during shift clock period $T_5$ to store the interpolated data word now supplied thereto from averaging circuit 20 by switch circuits 23 and 24. It is seen that this positive transition in the latch clock pulse I substantially coincides with the positive transition of the third averaging pulse G.

To summarize, when condition (b) is detected, that is, when two successive data words are preceded and followed, respectively, by correct data words, the correct data words stored in latch circuits 16 and 19 first are averaged to produce a pseudo interpolated word. This pseudo interpolated word is stored temporarily in latch circuit 18 and is averaged by averaging circuit 20 with the correct data word stored in latch circuit 16. As a result, a first interpolated data word is produced and is stored in latch circuit 17 in place of the erroneous data word which had been stored therein. Then, the interpolated data word stored in latch circuit 17 is averaged with the correct data word stored in latch circuit 19 to produce a second interpolated data word; this second interpolated data word now being stored in latch circuit 18 in place of the pseudo interpolated word which had been stored therein.

In the foregoing description, the pseudo interpolated data word is stored in latch circuit 18 and then is averaged with the correct data word stored in latch circuit 16, resulting in a first interpolated data word that is supplied to latch circuit 17. Alternatively, the pseudo interpolated word may be stored in latch circuit 17, and this pseudo interpolated word then may be averaged with the correct data word stored in latch circuit 19, resulting in an interpolated data word which then is stored in latch circuit 18. This interpolated data word stored in latch circuit 18 then may be averaged with the correct data word stored in latch circuit 16 to produce another interpolated data word which is stored in latch circuit 17. In either operative embodiment, it is seen that averaging circuit 20 undergoes three successive averaging operations to produce the pseudo interpolated word, then the first interpolated data word and then the second interpolated data word.

In the embodiment shown in FIG. 4A, it is assumed that the data word register need be of sufficient capacity merely to store four successive data words. If desired, any greater number of data words may be stored in the data word register. Also, in order to carry out the once averaging compensation operation, any three successive data words may be used, whereby the erroneous data word is replaced by an interpolated data word derived from the average of the preceding and following data words. Also, the thrice averaging compensation operation may be replaced by other plural averaging techniques, whereupon a plurality of successive erroneous data words are replaced by interpolated data words which are derived from averaging operations utilizing the data words which precede and follow the erroneous ones. Still further, other more complicated compensation techniques may be used in place of the once averaging and thrice averaging compensation operations described herein.

Figure 6:
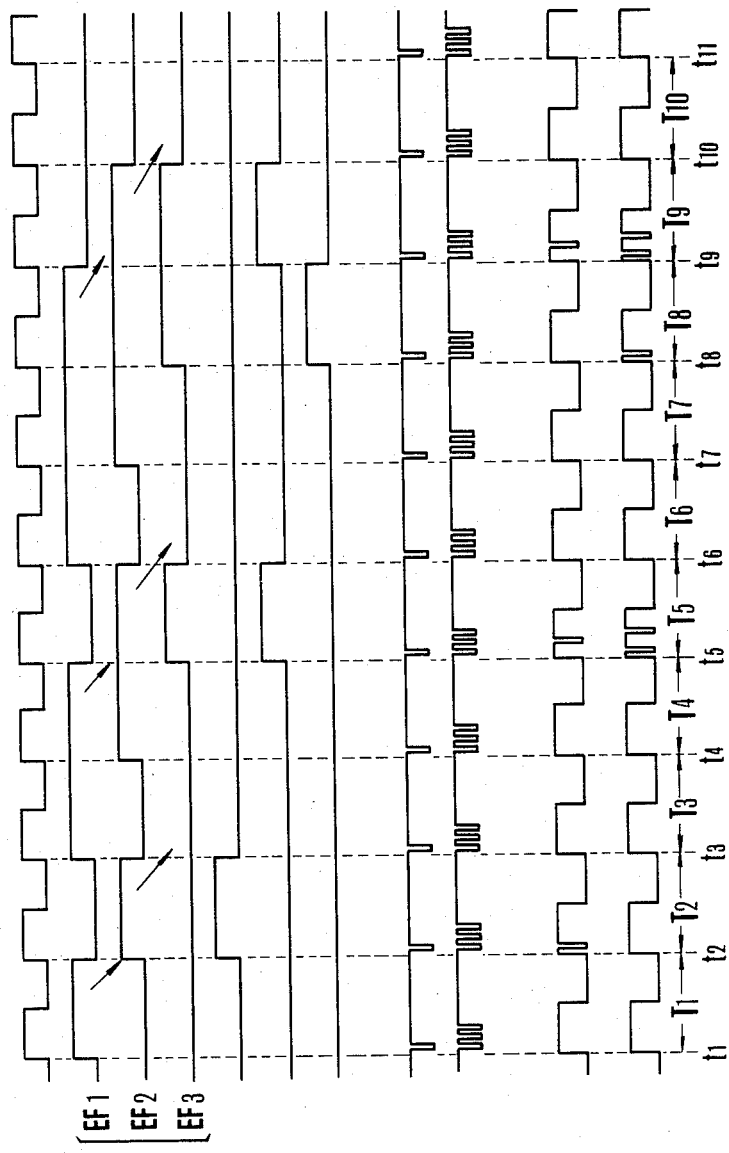
FIGS. 6A–6I are timing diagrams which are useful in understanding the operation of the embodiment shown in FIG. 4A.

Returning now to the operation represented by the waveform diagrams of FIG. 6, it is appreciated that, during shift clock period $T_5$, the erroneous data words which had been stored in latch circuits 17 and 18 are replaced by interpolated data words. Since the data word now stored in latch circuit 17 is assumed to be correct, the error flag which accompanied the data word previously stored therein should not be shifted into latch circuit 15 at the next shift clock pulse at time $t_6$. Clear pulse generator 35 responds to the error flags $EF_1 = "0"$ and $EF_2 = "1"$ during shift clock period $T_5$ to supply a clear pulse to latch circuit 15 at time $t_6$. Hence, the error flag $EF_2 = "1"$ properly is not shifted into latch circuit 15 at time $t_6$.

Let it now be assumed that, at times $t_6$, $t_7$ and $t_8$, three successive erroneous data words are shifted into the data word register. Hence, at time $t_8$, the data words stored in latch circuits 16, 17 and 18 are erroneous (indicated by error flags $EF_1 = EF_2 = EF_3 = "1"$), but the data word now stored in latch circuit 19 is correct. It is recognized that the foregoing corresponds to error condition (c), resulting in waveform 6E exhibiting a binary "1". When waveform 6E is a binary "1", switch circuit 21 couples the output of latch circuit 16 to latch circuit 17, thereby supplying the erroneous data word stored in latch circuit 16 to latch circuit 17 at the beginning of the next-following shift clock period $T_9$; and switch circuits 23 and 24 now respond to the binary "1" of waveform 6E to feed back the output of latch circuit 19 to the input of latch circuit 18.

As shown in FIG. 6I, latch clock pulse I undergoes a positive transition during the shift clock period $T_8$. Latch circuit 18 responds to this positive transition of latch clock pulse I so as to store therein the data word which is supplied thereto from latch circuit 19 via switch circuits 23 and 24. Hence, at time $t_9$, the data word stored in latch circuit 18, which now is identical to the data word stored in latch circuit 19, is shifted into latch circuit 19, whereby the previous value of this data word is used once again.

From FIG. 6B, it is assumed that, at time $t_9$, the next data word supplied to the data word register is correct. Since the data words which had been stored in latch circuits 16 and 17 have been shifted into latch circuits 17 and 18, respectively, and since the data word now stored in latch circuit 19 is assumed to be correct by means of the previous value hold operation which had been carried out, it will be appreciated that, at time $t_9$, error condition (b) is detected. That is, the successive data words stored in latch circuits 17 and 18 are erroneous, and these erroneous words are preceded and followed, respectively, by correct data words. Hence, during shift clock period $T_9$, the thrice averaging compensation operation is carried out. This operation had been described in detail hereinabove and, in the interest of brevity, further description is not repeated herein.

From the foregoing description, it is appreciated that data words are shifted sequentially through the data word register comprised of latch circuits 16–19. The output of latch circuit 19 is coupled to output terminal 10 from which the data words are transmitted to further apparatus, such as digital-to-analog converters, and the like. It also is appreciated that erroneous data words stored in the data word register are compensated by means of the once averaging, thrice averaging or previous value hold technique, depending upon the particular error condition which is detected. Hence, although an erroneous data word may be shifted into the data word register, output terminal 10 thereof is supplied with compensated data words. The error compensator illustrated in FIG. 4A is readily adapted such that different compensation techniques are carried out in order to account for different error conditions. In particular, the previous value hold compensation operation, which affords the least accurate approximation of a correct data word, is carried out only if more accurate compensation techniques cannot be used because of, for example, a relatively large burst error.

In the embodiment of FIG. 4A, erroneous data words are corrected before they can be shifted into latch circuit 19, the output stage of the data word register. As discussed above, if an erroneous data word is shifted into latch circuit 17 and/or latch circuit 18, such erroneous data words are corrected before they can be shifted to the next-following stage of the data word register. FIG. 7 is a block diagram representing another embodiment of the present invention wherein an erroneous data word is not corrected until it is to be shifted into the output stage of the data word register.

The embodiment of FIG. 7 includes a data word register comprised of latch circuits 26, 27, 28 and 29, an error flag register comprised of latch circuits 13, 14 and 15, averaging circuit 20, selector circuits 31 and 32 and switch circuits 33 and 34. The embodiment of FIG. 7 also includes a latch circuit 30 coupled to the output of averaging circuit 20. Since the error flag register of FIG. 7 is substantially identical to the error flag register described above with respect to FIG. 4A, further description thereof is not provided. It should be mentioned, however, that clear pulse generator 35 is not utilized in the error flag register of FIG. 7. It will become appreciated that such a clear pulse generator is not needed.

Averaging circuit 20 includes one input fixedly coupled to the output of latch circuit 29 and another input which is adapted to be supplied by means of selector circuits 31 and 32 with data words stored selectively in latch circuits 26, 27 or 30. Selector circuits 31 and 32 may be similar to aforedescribed selector circuits 22 and 25, and need not be described further herein.

The output of averaging circuit 20 is coupled to latch circuit 30 and, in addition, is coupled by way of switch circuits 33 and 34 to latch circuit 29. Switch circuits 33 and 34 are adapted to selectively supply to latch circuit 29 the data word stored in latch circuit 28, or the interpolated word produced by averaging circuit 20, or to re-supply to latch circuit 29 the data word already stored therein.

Before describing the operation of the embodiment shown in FIG. 7, reference is made to the table illustrated in FIG. 8 which represents all of the various possible conditions of error flags $EF_1$, $EF_2$ and $EF_3$. Depending upon the sensed conditions of these error flags, a particular error compensation technique is carried out. It is noted that, when a correct data word is stored in latch circuit 28, as represented by the error flag $EF_3=$"0", a compensation operation is not performed. This is because the correct data word will be shifted, at the next shift clock pulse, into latch circuit 29, and thereafter, this correct data word will be shifted to output terminal 10. Thus, since a correct data word will be shifted out of the data word register, there is no need to correct it; and, accordingly, error compensation is not carried out if the data word stored in latch circuit 28 is correct. However, error compensation is implemented whenever an erroneous data word is shifted into this latch circuit. Such error compensation is limited to correcting the data word stored in latch circuit 28 so as to insure that, upon the next shift clock pulse, a correct data word will be shifted into latch circuit 29, the output stage of the data word register.

In view of the foregoing, it is seen from the table of FIG. 8 that once averaging compensation is carried out when an erroneous data word is shifted into latch circuit 28 but a correct data word is shifted into latch circuit 27. That is, the once averaging compensation technique is implemented when $EF_2=$"0" and $EF_3=$"1".

When erroneous data words are stored in latch circuits 27 and 28, the thrice averaging compensation technique is carried out. Such erroneous data words are represented by the set states of their corresponding error flags; and, hence, when the error condition represented by $EF_2=EF_3=$"1" and $EF_1=$"0" is detected, thrice averaging compensation is implemented.

Finally, when an erroneous data word is stored in each of latch circuits 26, 27 and 28, that is, when three successive data words are erroneous, previous value hold compensation is carried out. Thus, when $EF_1=EF_2=EF_3=$"1", this previous value hold compensation technique is implemented.

In all of the foregoing error compensation techniques carried out by the embodiment shown in FIG. 7, the data word stored in latch circuit 28 is replaced by a correct or compensated data word which is shifted into latch circuit 29 at the next-following shift clock pulse. It is appreciated that the contents of latch circuits 26 and 27 are shifted into latch circuits 27 and 28, respectively, in response to this next-following shift clock pulse; and latch circuit 26 concurrently receives the next succeeding data word. If the previous value hold compensation operation had been carried out immediately prior to this shift clock pulse, the error condition of the next succeeding data word which is shifted into latch circuit 26 determines the type of error compensation operation that is next carried out. For example, if a correct data word is shifted into latch circuit 26, then thrice averaging compensation will be performed during the next shift clock period. However, if an erroneous data word is shifted into this latch circuit, then previous value hold compensation will be performed once again during the next shift clock period.

The operation of the error compensation apparatus shown in FIG. 7 now will be described with reference to the timing diagrams illustrated in FIGS. 9A–9E. It will recognized that the waveforms shown in FIGS. 9A–9E are similar to the aforedescribed waveforms shown in FIGS. 6A–6E. Thus, FIG. 9A represents the shift clock pulses A which are supplied to each of the error flag latch circuits 13-15 and to each of the data word latch circuits 26-29. These shift clock pulses are assumed to occur at times $t_1, t_2, t_3 \ldots t_{10}, t_{11}$, and define shift clock periods $T_1, T_2, \ldots T_{10}$, respectively. Successive data words are supplied to input terminal 12 of the data word register in synchronism with shift clock pulses A.

FIG. 9B represents the error flags during respective shift clock periods. The waveform illustrated in FIG. 9C is seen to exhibit a binary "1" level when an erroneous data word is stored in latch circuit 28 ($EF_3$="1") and a correct data word is stored in latch circuit 27 ($EF_2$="0"). As was discussed previously with respect to the embodiment of FIG. 4A, when the waveform of FIG. 9C is a binary "1", the once averaging compensation operation is performed. Hence, waveform 9C may be viewed as an error identifying signal which identifies the occurrence of error condition (a)—an erroneous data word preceded and followed, respectively, by correct data words.

The waveform of FIG. 9D is a binary "1" when $EF_1$="0" and $EF_2=EF_3$="1". When the waveform of FIG. 9D exhibits its binary "1" level, the thrice averaging operation is carried out. This waveform may be viewed as an error identifying signal which identifies the presence of error condition (b)—plural successive erroneous data words preceded and followed, respectively, by correct data words.

The waveform of FIG. 9E exhibits its binary "1" level when all of the data words stored in latch circuits 26, 27 and 28 are erroneous, that is, when $EF_1=EF_2=EF_3$="1". This waveform thus identifies the presence of error condition (c)—a predetermined number (e.g. three) of successive erroneous data words preceded by a correct data word.

Let it be assumed that the data words whose error conditions are represented by the waveforms shown in FIG. 9B are supplied successively to the data word register of FIG. 7. Let it further be assumed that, prior to time $t_1$, a correct data word had been stored in each of latch circuits 26-29. When an erroneous data word followed by a correct data word followed by an erroneous data word are received successively by the data word register, the contents of this register are as represented by FIG. 9B at time $t_3$. Hence, the waveform of FIG. 9C exhibits its binary "1" level, identifying the presence of condition (a). Accordingly, selector circuits 31 and 32 are controlled in response to this detected error condition to supply to averaging circuit 20 the correct data word stored in latch circuit 27. Since the output of latch circuit 29 is connected directly to the averaging circuit, it will be appreciated that averaging circuit 20 responds to an averaging pulse supplied thereto to produce an interpolated data word equal to the average of the data words stored in latch circuits 27 and 29. Although not shown in FIG. 9, the averaging pulses supplied to averaging circuit 20 may be similar to averaging pulses F shown in FIG. 6F. As will be described below, a modification is made to these averaging pulses when error condition (b) is detected and the thrice averaging operation is carried out. When this error condition is detected, two successive averaging pulses are supplied to the averaging circuit during a shift clock period. This will become clear from the description below.

When error condition (a) is detected and the once averaging operation is carried out, switch circuits 33 and 34 are controlled so as to couple latch circuit 29 to averaging circuit 20. That is, during shift clock period $T_3$, the connection of the output of latch circuit 28 to the input of latch circuit 29 is interrupted and, in place thereof, the output of averaging circuit 20 is connected to the input of latch circuit 29. Consequently, at time $t_4$, the time of occurrence of the next-following shift clock pulse, latch circuit 29 is enabled to store the data word supplied thereto, which data word is the interpolated data word that had been produced by averaging circuit 20. It is seen, therefore, that the erroneous data word which had been stored previously in latch circuit 28 is not shifted into latch circuit 29 but, rather, is replaced by a compensated data word. Of course, at time $t_4$, the contents of latch circuits 26 and 27 are shifted into latch circuits 27 and 28, respectively, and the next data word is shifted into latch circuit 26. It is assumed that this next data word is erroneous, as represented by $EF_1$="1"at time $t_4$.

At time $t_4$, a correct data word is shifted into latch circuit 28. Hence, no error compensation is carried out during shift clock period $T_4$. But, at time $t_5$, it is assumed that a correct data word is shifted into latch circuit 26 and, as represented by the waveforms of error flags $EF_1$, $EF_2$ and $EF_3$ in FIG. 9B, erroneous data words are shifted into latch circuits 27 and 28. Consequently, error condition (b) is detected, as represented by the binary "1" waveform of FIG. 9D at time $t_5$, thus commanding the operation of the thrice averaging technique.

In response to the detection of error condition (b), selector circuits 31 and 32 are controlled so as to supply to averaging circuit 20 the correct data word stored in latch circuit 26. The averaging circuit responds to the averaging pulse supplied thereto to produce a pseudo interpolated word derived from the average of the data word supplied from latch circuit 26 and the data word supplied from latch circuit 29. This pseudo interpolated is stored temporarily in latch circuit 30. Although not shown in FIG. 7, it should be appreciated that latch circuit 30 is supplied with a latch pulse which, for example, may be the positive transition in the averaging pulse that has been supplied to the averaging circuit. For example, latch circuit 30 may be supplied with the positive transition of averaging pulse F shown in FIG. 6F.

Now, since error condition (b) had been detected, selector switch 32 is changed over so as to supply the pseudo interpolated word stored in latch circuit 30 to averaging circuit 20. Another averaging pulse is supplied to averaging circuit 20 during shift clock period $T_5$, whereupon the averaging circuit produces an interpolated data word derived by averaging the pseudo interpolated word supplied thereto from latch circuit 30 by way of selector switch 32 and the correct data word which still remains stored in latch circuit 29. Switch circuits 33 and 34 now are controlled in response to detected condition (b) to couple latch circuit 29 to averaging circuit 20. Hence, at time $t_6$, upon the occurrence of the next shift clock pulse, the interpolated data word which is produced by averaging circuit 20 is shifted into latch circuit 29; and the erroneous data word which had been stored previously in latch circuit 28 is effectively erased.

At time $t_6$, the erroneous data which had been stored in latch circuit 27 is shifted into latch circuit 28, and the correct data word which had been stored in latch circuit 26 is stored in latch circuit 27. It is assumed that, at this time, the next-following data word which is supplied to the data word register is erroneous.

Since latch circuit 29 is supplied with an interpolated data word which, for the purpose of the operation of the illustrated embodiment is assumed to be correct, it is seen that, at time $t_6$, a correct data word is stored in latch circuit 29, an erroneous data word is stored in latch circuit 28 and a correct data word is stored in latch circuit 27. Hence, at time $t_6$, error condition (a) is detected. Accordingly, the once averaging compensation technique is carried out. This has been described above and, in the interest of brevity, is not repeated herein. It will be appreciated that, at time $t_7$, upon the occurrence of the next-following shift clock pulse, an interpolated data word will be shifted into latch circuit 29 from averaging circuit 20 in place of the erroneous data word stored in latch circuit 28.

From the foregoing description, it is seen that, when error condition (b) is detected, the thrice averaging operation is carried out over two successive shift clock periods. That is, during the first shift clock period, the first of the two successive erroneous data words is replaced by an interpolated data word. Then, in the next shift clock period, the second erroneous data word is replaced by another interpolated data word. Although these successive replacements are carried out during successive shift clock periods, it will be recognized that the interpolated data words which are used to replace the erroneous data words are consistent with the equations which have been set forth hereinabove.

Let it now be assumed that, at times $t_6$, $t_7$ and $t_8$, three successive erroneous data words are supplied to the data word register. This is represented by the waveform of error flag $EF_1$ shown in FIG. 9B. At time $t_8$, the error flag stored in each of error flag latch circuits 13, 14 and 15 is a binary "1", thus indicating the presence of error condition (c). Hence, the waveform of FIG. 9E exhibits its binary "1" level.

In response to the detection of error condition (c), switch circuits 33 and 34 are controlled so as to couple the output of latch circuit 29 back to the input thereof. Thus, at time $t_9$, upon the occurrence of the next-following shift clock pulse, the data word which had been stored in latch circuit 29 is fed back and stored therein once again. Furthermore, the erroneous data word which had been stored in latch circuit 28 is erased, and the erroneous data words which had been stored in latch circuits 26 and 27 are shifted into latch circuits 27 and 28, respectively.

If it is assumed that, at time $t_9$, the next successive data word which is supplied to the data word register is correct, then the contents of the data word register are seen to be a correct data word stored in latch circuit 29 (it is assumed, by carrying out the previous value hold compensation technique, latch circuit 29 retains a correct data word), erroneous data words stored in latch circuits 27 and 28 and a correct data word stored in latch circuit 26. Thus, at time $t_9$, error condition (b) is detected, as shown by the binary "1" waveform of FIG. 9D. Hence, during shift clock period $T_9$, the thrice averaging compensation operation is carried out in the manner described above. In accordance with this operation, the erroneous data word stored in latch circuit 28 is not shifted into latch circuit 29 at time $t_{10}$; but, rather, the interpolated data word produced by averaging circuit 20 is. Accordingly, at time $t_{10}$, upon the occurrence of the next shift clock pulse, the erroneous data word which had been stored in latch circuit 27 is shifted into latch circuit 28, and the correct data word which had been stored in latch circuit 26 is shifted into latch circuit 27. It is assumed that, at this time, the next succeeding data word which is supplied to the data word register is correct. Consequently, at time $t_{10}$, error condition (a) is detected, and the once averaging operation is carried out during shift clock period $T_{10}$.

As was described with reference to the embodiment shown in FIG. 4A, it is seen that, after the previous value hold compensation operation is implemented, the thrice averaging compensation technique is carried out in the next-following shift clock period, provided that the next data word which is supplied to the data word register is correct.

It also is seen that, in the embodiment of FIG. 7, the thrice averaging operation is carried out in successive shift clock periods. This is because, in the embodiment of FIG. 7, only the data word which is stored in latch circuit 28 need be corrected during any shift clock period. If this data word is followed by another erroneous data word, then this following data word is corrected once it is supplied to latch circuit 28.

While the present invention has been particularly shown and described with reference to certain preferred embodiments, it will be readily appreciated by those of ordinary skill in the art that various changes and modifications in form and details may be made without departing from the spirit and scope of the invention. For example, the thrice averaging compensation technique need not be limited solely to correcting two successive erroneous data words that are preceded and followed, respectively, by correct data words. Alternatively, n successive erroneous data words may be compensated by multiple interpolation operations if these n data words are preceded and followed, respectively, by m correct data words. In any event, an advantageous feature of the present invention is to utilize the previous value hold compensation operation only when interpolation compensation cannot be carried out effectively. Thus, by the present invention, close approximations of correct data words generally are attained whenever possible.

It also is contemplated that the apparatus illustrated in FIGS. 4 and 7 may be implemented either by discrete logic circuits or by a suitably programmed microprocessor. If the latter, the microprocessor may be conventional, such as those manufactured by Intel Corp., Motorola Corp., Zilog, Texas Instruments, and the like. The microprocessor program by which the operations discussed above with reference to FIGS. 4 and 7 may be carried out will become readily apparent to those of ordinary skill in the programming art without undue experimentation.

It is, therefore, intended that the appended claims be interpreted as including the foregoing as well as other changes and modifications.

What is claimed is:

1. A method of selective and digitally compensating burst errors of variable length in successive data words; comprising the steps of:

receiving said successive data words;

identifying those data words which are erroneous and those data words which are correct;

sensing the presence of one of the following error conditions: (a) an erroneous data word preceded and followed, respectively, by correct data words; (b) two successive erroneous data words preceded and followed, respectively, by correct data words; and (c) at least three successive erroneous data words preceded by a correct data word; and compensating the respectively sensed error condition as follows:

in condition (a), replacing the erroneous data word with a compensated data word which is an average of the correct preceding and following data words; in condition (b), replacing the erroneous data words with respective compensated data words derived by a process including averaging said correct preceding and following data words to produce a pseudo data word, and average said pseudo data word with one of said correct preceding and following data words to produce a compensated data word for replacing one of said erroneous data words and in condition (c), replacing at least the first of said successive erroneous data words with the preceding correct data word.

2. The method of claim 1 wherein said pseudo data word is averaged with said correct preceding data word to produce said compensated data word, and said compensated data word replaces the first of said two successive erroneous data words.

3. The method of claim 1 further including the steps of averaging said compensated data word with the other of said correct preceding and following data words to produce another compensated data word for replacing the other of said erroneous data words.

4. The method of claim 1 wherein said error conditions are sensed in successive time periods; and wherein a sensed error condition is compensated during a time period prior to the next-following time period.

5. The method of claim 4 wherein the compensation of error condition (c) during one time period results in sensing error condition (b) at the next-following time period if the next-received data word is identified as being correct.

6. A method of selectively compensating burst errors of variable length in successive data words, comprising the steps of receiving said successive data words in successive clock time periods; shifting successively received data words through successive stages of a register at successive clock time periods; identifying during each clock time period which of three successive data words in said register are erroneous and which are correct, respectively; sensing when the data word in a first stage of said register is correct and the data word in a second stage is erroneous and the data word in a third stage is correct, and replacing the erroneous data word in said second stage with a compensated data word derived by averaging the data words in said first and third stages; sensing when the data word in said first stage is correct and the data word in said second stage is erroneous and the data word in said third stage is erroneous, and replacing the erroneous data words in said second and third stages with replacement compensated data words derived by (i) averaging the data words in said first stage and in a fourth stage to produce a pseudo compensated data word, (ii) averaging said pseudo-compensated data word with the data word stored in one of said first and fourth stages to derive a first replacement compensated data word, and (iii) averaging said first compensated data word with the data word stored in the other of said first and fourth stages to derive a second replacement compensated data word; and sensing when the data words in said first, second and third stages all are erroneous, and replacing the erroneous data word in said third stage with the data word in said fourth stage.

7. The method of claim 6 wherein each step of replacing is carried out before the contents of said first, second, third and fourth stages are shifted to the respective next-following stages of said register.

8. The method of claim 7 wherein when the data words in said second and third stages are sensed as erroneous and the data word in said first stage is sensed as correct, the erroneous data words are replaced by said first and second replacement compensated data words before being shifted to the third and fourth stages, respectively.

9. The method of claim 7 wherein when the data words in the first, second and third stages are sensed as all erroneous, receipt of the next data word, if correct, at the next clock time period causes the data word then in said first stage to be sensed as correct and the data words then in said second and third stages to be sensed as erroneous.

10. A method of selectively and digitally compensating burst errors of variable length in successive data words, comprising the steps of receiving said successive data words in successive clock time periods; shifting successively received data words through successive stages of a register at successive clock time periods; identifying during each clock time period which of three successive data words in said register are erroneous and which are correct, respectively; sensing when the data word in a second stage of said register is correct and the data word in a third stage is erroneous, and deriving a compensated data word by averaging the data word in said second stage with the data word in a fourth stage of said register and shifting said compensated data word into said fourth stage in place of the data word in said third stage at the next clock time period; sensing when the data word in a first stage of said register is correct and the data words in said second a third stage are erroneous, and deriving a compensated data word by averaging the data word in said first stage with the data word in said fourth stage to produce a pseudo compensated data word and then averaging said pseudo compensated data word with said data word in said fourth stage to produce said compensated data word and shifting said compensated data word into said fourth stage in place of the data word in said third stage at the next clock time period; and sensing when the data words in said first, second and third stages all are erroneous, and retaining the data word in said fourth stage at the next clock time period in place of shifting thereinto the data word in said third stage.

11. The method of claim 10 wherein said step of averaging said pseudo compensated data word with the data word in said fourth stage includes the step of temporarily storing said pseudo compensated data word for a length of time sufficient to carry out said step of averaging.

12. Apparatus for selectively compensating burst errors of variable length in successive data words, comprising:
an input for receiving said successive data words;
identifying means coupled to said input for identifying which data words are erroneous and which are correct, respectively;
interpolating means for producing an interpolated data word by averaging two data words supplied thereto;
sensing means coupled to said identifying means for sensing one of the following conditions:

(a) the presence of an erroneous data word preceded and followed, respectively, by correct data words, (b) the presence of two successive erroneous data words preceded and followed, respectively, by correct data words, and (c) the presence of at least three successive erroneous data words preceded by a correct data word;

supply means coupled to said input and responsive to sensed conditions (a) and (b) for supplying to said interpolating means the preceding and following correct data words of the respectively sensed conditions;

interpolation control means coupled to said interpolating means and to said sensing means and responsive to condition (a) for controlling said interpolating means to operate once, said interpolation control means being responsive to condition (b) for controlling said interpolating means to operate three times to produce three interpolated data words including a pseudo data word and two compensated data words; and replacement means coupled to said interpolating means and to said sensing means and responsive to condition (a) for replacing the erroneous data word with the interpolated data word, said replacement means being responsive to condition (b) for respectively replacing the two successive erroneous data words with said two compensated data words, and said replacement means being responsive to condition (c) for replacing at least the first of said successive erroneous data words with the preceding correct data word.

13. The apparatus of claim 12 wherein said interpolation control means includes means responsive to condition (b) to temporarily store said pseudo data word produced by said interpolating means in response to the averaging of said preceding and following data words, and means for supplying the temporarily stored pseudo data word and one of said preceding and following data words to said interpolating means for averaging therein to produce one of said compensated data words.

14. The apparatus of claim 13 wherein said interpolation control means further includes means for supplying said one compensated data word and the other of said preceding and following data words to said interpolating means for averaging therein to produce the other of said compensated data words.

15. The apparatus of claim 14 wherein said replacement means includes means for replacing a first of said two successive erroneous data words with said one compensated data word, and means for replacing a second of said two successive erroneous data words with said other compensated data word.

16. The apparatus of claim 12 wherein each successive data word is accompanied by an error flag; and said identifying means includes flag storage means for storing the error flags of said received successive data words.

17. The apparatus of claim 16 wherein said input includes register means having plural stages for storing respective data words; and shift clock means coupled to said register means for shifting plural data words into successive stages in successive shift clock periods.

18. The apparatus of claim 17 wherein said flag storage means comprises flag register means having plural stages for storing respective error flags of said data words and coupled to said shift clock means for shifting successive error flags into successive flag register stages in said successive shift clock periods.

19. The apparatus of claim 18 wherein said sensing means includes means coupled to the stages of said flag register for detecting the conditions of the respective error flags stored in said flag register, thereby sensing conditions (a), (b) and (c), respectively.

20. The apparatus of claim 19 wherein said supply means includes selector means coupled to preselected stages of said data word register means for supplying the data words stored in selected stages to said interpolating means as a function of the detected conditions of the stored error flags.

21. The apparatus of claim 20 wherein said interpolation control means includes pulse generating means for generating one and for generating plural averaging pulses during a shift clock period, and averaging pulse supply means responsive to the detected conditions of the stored error flags to selectively supply said one averaging pulse or said plural averaging pulses to said interpolating means.

22. The apparatus of claim 21 wherein said data word register means includes four stages and said flag register includes three stages for storing the error flags of the first, second and third data words respectively stored in the first, second and third stages of said data word register means.

23. The apparatus of claim 22 wherein said selector means comprises a first selector coupled to said first and second stages of said data register means for selectively supplying to said interpolating means the data word stored in one of said first and second stages, and a second selector coupled to said third and fourth stages of said data register means for selectively supplying to said interpolating means the data word stored in one of said third and fourth stages.

24. The apparatus of claim 23 wherein said first and second selectors and said averaging pulse supply means are responsive to the detection of an error condition of the error flag stored in the second stage of said error flag register and the detection of a correct condition of the error flag stored in the first and third stages of said error flag register to supply to said interpolating means the data words stored in the first and third stages of said data word register means, and to supply said one averaging pulse to said interpolating means, whereby an interpolated word derived from the average of the supplied data words is produced.

25. The apparatus of claim 23 wherein said replacement means includes a first switch for selectively supplying to said second stage of said data word register means one of the data word stored in said first stage and the interpolated word produced by said interpolating means, said first switch being responsive to detected condition (a) to supply said interpolated data word to said second stage of said data word register means for storage therein prior to the beginning of the next shift clock period and to change over the error flag stored in the second stage of said error flag register from an error condition to a correct condition; and said replacement means further includes a second switch coupled to the third stage of said data word register means.

26. The apparatus of claim 25 wherein said first and second selectors and said averaging pulse supply means are responsive to the detection of a correct condition of the error flag stored in said first stage of said error flag register and the detection of error conditions of the error flags stored in both said second and third stages of said error flag register to supply to said interpolating means the data words stored in the first and fourth stages of said data word register means, and to supply said plural averaging pulses to said interpolating means, whereby plural interpolated words are derived successively from averaging the supplied data words.

27. The apparatus of claim 26 wherein said interpolating means produces a pseudo data word by averaging the data words supplied thereto from said first and fourth stages of said data word register means in response to the first of said plural averaging pulses; and further including means for temporarily storing said pseudo data word and means for supplying said temporarily stored pseudo data word to said interpolating means; and wherein one of said first and second selectors thereafter is further responsive to the detection of a correct condition of the error flag stored in said said first stage of the error flag register and to the detection of erroneous conditions of the error flags stored in said second and third stages thereof to supply to said interpolating means the data word stored in one of said first and fourth stages, respectively, of said data word register means, said interpolating means being responsive to a second of said averaging pulses to produce an interpolated data word by averaging the data word and pseudo data word supplied thereto; one of said first and second switches being operative to supply said interpolated data word selectively to one of said second or third stages, respectively, of said data word register means and to change over the error flag stored in a corresponding one of said second or third stages of said error flag register from an error condition to a correct condition, said first and second selectors thereafter being further operative to supply to said interpolating means the interpolated data word selectively stored in said second or third stages of the data word register means and the data word stored in the other of said first and fourth stages, said interpolating means being responsive to a third of said averaging pulses to produce another interpolated data word by averaging the data word and interpolated data word supplied thereto; and the other of said first and second switches being operative to supply said other interpolated data word to the other of said second and or third stages of said data word register means and to change over the error flag stored in a corresponding one of the second and third stages, respectively, of said error flag register from said erroneous condition to said correct condition.

28. The apparatus of claim 27 wherein said first switch has inputs supplied with the data word of said first stage of the data word register means and an interpolated data word produced by said interpolating means, and an output coupled to said second stage of the data word register means; said second switch has inputs supplied with the data word of said second stage of the data word register means and an interpolated data word produced by said interpolating means, and an output coupled to said third stage of the data word register means; said first switch being responsive to detected condition (a) to supply to its output the interpolated data word produced by said interpolating means, and said second switch being responsive to detected condition (a) to supply to its output the data word of said second stage; and said first switch being responsive to detected condition (b) to supply to its output the interpolated data word produced by said interpolating means in response to the second of said plural averaging pulses, and said second switch being responsive to detected condition (b) to supply to its output the interpolated data words produced by said interpolating means in response to the first and third of said plural averaging pulses.

29. The apparatus of claim 27 wherein said replacement means further includes a third switch responsive to detected condition (c) for supplying to said third stage of the data word register means prior to the beginning of the next shift clock period the data word stored in said fourth stage thereof and for changing over the error flag stored in the third stage of said error flag register from an error condition to a correct condition; such that, upon the occurrence of the next shift clock period, the data word previously stored in said fourth stage is shifted thereinto again.

30. The apparatus of claim 29 wherein each of said stages of said data word register means comprises of a latch circuit, and further comprising latch pulse generating means for supplying to each latch circuit a latch pulse at the beginning of each shift clock period.

31. The apparatus of claim 30 wherein said latch pulse generating means includes means responsive to detected condition (a) for supplying to said second stage latch circuit an additional latch pulse during the then-present shift clock period to enable said second stage latch circuit to store the interpolated data word produced by said interpolating means.

32. The apparatus of claim 31 wherein said latch pulse generating means further includes means responsive to detected condition (b) for supplying to said third stage latch circuit additional latch pulses in synchronism with said first and third averaging pulses during the then-present shift clock period to enable said third stage latch circuit to store the interpolated data words produced by said interpolating means, and for supplying to said second stage latch circuit an additional latch pulse in synchronism with said second averaging pulse during the then-present shift clock period to enable said second stage latch circuit to store the interpolated data word produced by said interpolating means.

33. The apparatus of claim 32 wherein said latch pulse generating means further includes means responsive to detected condition (c) for supplying to said third stage latch circuit an additional latch pulse during the then-present shift clock period to enable the third stage latch circuit to store the data word supplied thereto by said third switch.

34. The apparatus of claim 22 wherein said selector means comprises a first selector coupled to said first and second stages of said data register means for selectively supplying to said interpolating means the data word stored in one of said first and second stages, and means for supplying to said interpolating means the data word stored in said fourth stage of said data word register means.

35. The apparatus of claim 34 wherein said first selector and said averaging pulse supply means are responsive to the detection of an error condition of the error flag stored in the third stage of said error flag register and the detection of a correct condition of the error flag stored in the second stage of said error flag register to supply to said interpolating means the data word stored in second stage of said data word register means, and to supply said one averaging pulse to said interpolating means, whereby an interpolated word derived from the average of the data words supplied from said second and fourth stages of said data word register means is produced.

36. The apparatus of claim 35 wherein said replacement means comprises a switch for normally supplying to said fourth stage of said data word register means the data word stored in said third stage thereof, said switch being responsive to detected condition (a) to supply the produced interpolated data word to said fourth stage for storage therein, at the next shift clock period.

37. The apparatus of claim 36 wherein said first selector and said averaging pulse supply means are responsive to the detection of a correct condition of the error flag stored in said first stage of said error flag register and the detection of error conditions of the error flags stored in both said second and third stages of said error flag register to supply to said interpolating means the data word stored in said first stage of said data word register means, and to supply said plural averaging pulses to said interpolating means, whereby plural interpolated words are derived successively from averaging the supplied data words.

38. The apparatus of claim 37 wherein said interpolating means includes averaging means and temporary storage means for temporarily storing an interpolated word derived by said averaging means from averaging the data words supplied thereto, and said selector means further comprises a second selector coupled to said first selector and to said temporary storage means for selectively supplying to said averaging means one of the data word supplied by said first selector and the interpolated word stored in said temporary storage means; whereby said averaging means produces a pseudo data word by averaging the data words supplied thereto from said first and fourth stages of said data word register means in response to the first of said plural averaging pulses, said pseudo data word being temporarily stored in said temporary storage means, and the temporarily stored pseudo data word being supplied by said second selector to said averaging means for averaging with said data word supplied from said fourth stage to produce an interpolated data word in response to the second of said plural averaging pulses; and wherein the switch of said replacement means is responsive to detected condition (b) to supply the last-mentioned interpolated data word produced by said averaging means to said fourth stage for storage therein at the next shift clock period.

39. The apparatus of claim 38 wherein said replacement means further includes a second switch responsive to detected condition (c) for supplying to said fourth stage of the data word register means at the next shift clock period the data word stored in said fourth stage so as to retain said data word in said fourth stage for said next shift clock period.

40. The apparatus of claim 39 wherein each of the stages of said data word register means is comprises of a latch circuit, and further comprising latch pulse generating means for supplying to each latch circuit a latch pulse at the beginning of each shift clock period.

* * * * *